United States Patent
Ou-Yang et al.

(10) Patent No.: US 7,224,551 B1
(45) Date of Patent: May 29, 2007

(54) DISK DRIVE HAVING APERTURES ALIGNED NEAR THE INNER DIAMETER OF A DISK STACK FOR ALLOWING AIRFLOW TO PASS THROUGH THE APERTURES TO REDUCE DISK FLUTTER

(75) Inventors: Jin Hui Ou-Yang, San Jose, CA (US); Lin Yang, San Jose, CA (US); Chiao-Ping Ku, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 438 days.

(21) Appl. No.: 10/846,041

(22) Filed: May 15, 2004

(51) Int. Cl.
*G11B 17/02* (2006.01)
(52) U.S. Cl. .................. 360/98.08; 360/97.03
(58) Field of Classification Search ............. 360/97.03, 360/98.08
See application file for complete search history.

(56) References Cited

U.S. PATENT DOCUMENTS

| 3,573,771 | A | | 4/1971 | Cockrell, Jr. | |
|---|---|---|---|---|---|
| 3,975,769 | A | | 8/1976 | King | |
| 3,994,017 | A | * | 11/1976 | Barkhuff et al. | 360/98.03 |
| 4,051,541 | A | * | 9/1977 | McGinnis et al. | 360/98.02 |
| 4,345,285 | A | * | 8/1982 | DeMoss et al. | 360/133 |
| 4,680,656 | A | * | 7/1987 | Manzke et al. | 360/97.03 |
| 4,707,752 | A | * | 11/1987 | Gyi | 360/98.03 |
| 4,819,105 | A | | 4/1989 | Edwards | |
| 4,922,354 | A | * | 5/1990 | Edwards | 360/97.03 |
| 5,179,483 | A | | 1/1993 | Lowe | |

FOREIGN PATENT DOCUMENTS

| JP | 02-252185 A | * | 10/1990 |
|---|---|---|---|
| WO | WO 2004/051642 A1 | * | 6/2004 |

* cited by examiner

*Primary Examiner*—Jefferson Evans
(74) *Attorney, Agent, or Firm*—Stetina, Brunda, Garred & Brucker

(57) ABSTRACT

A disk drive includes a base, a spindle motor attached to the base, the spindle motor including a hub having hub apertures, a plurality of disks on the spindle motor and including a first and a second disk, a disk spacer between the first and second disks, and a disk clamp. The disk spacer has a plurality of spacer through apertures. Each of the spacer through apertures extend radially through the disk spacer. The disk clamp has clamp through apertures adjacent to an inner diameter of the disk clamp. Each of the clamp through apertures extend longitudinally through the disk clamp. The clamp through apertures, the hub apertures and the spacer through apertures are aligned for allowing airflow to pass through the apertures when the disks are rotating.

17 Claims, 4 Drawing Sheets

DISK DRIVE HAVING APERTURES ALIGNED NEAR THE INNER DIAMETER OF A DISK STACK FOR ALLOWING AIRFLOW TO PASS THROUGH THE APERTURES TO REDUCE DISK FLUTTER

BACKGROUND OF THE INVENTION

1. Field of the Invention

This invention relates to reducing disk flutter in a disk drive by having apertures near the ID ("inner diameter") of a disk stack for allowing airflow to pass though the apertures when the disks are rotating.

2. Description of the Prior Art and Related Information

A huge market exists for disk drives such as hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 40 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a disk drive base and a disk drive cover, at least one disk having at least one recording surface, a spindle motor for causing each disk to rotate, and an actuator arrangement. The printed circuit board assembly includes circuitry for processing signals and controlling operations. Actuator arrangements can be characterized as either linear or rotary; substantially every contemporary cost-competitive small form factor drive employs a rotary actuator arrangement.

In a typical disk drive, the rotating disks generate airflow within the interior of the head disk assembly. Such airflow creates an excitation force, which affects track following by a respective head over a respective disk surface. This excitation force is caused by the spatiotemporal fluctuation of pressure generated mainly by the disturbance of airflow onto a rotating disk and an actuator arm. The airflow may include secondary airflows, which move upward and downward in a longitudinal direction around the ID and OD ("outer diameter") of a disk. These secondary airflows impact disk vibration ("disk flutter") the most. The impact of the secondary airflows around the OD may be lessened with a tight shroud. However, a need remains to lessen the adverse effects of secondary airflows near the ID of the rotating disks.

SUMMARY OF THE INVENTION

This invention can be regarded as a disk drive including a disk drive base, a spindle motor attached to the disk drive base, the spindle motor including a hub having a plurality of hub apertures, each of the plurality of hub apertures extending through a portion of the hub, a plurality of disks positioned on the spindle motor, the plurality of disks including a first disk and a second disk, a disk spacer positioned between the first and second disks, the disk spacer having a plurality of spacer through apertures, the spacer through apertures being circumferentially spaced-apart, each of the plurality of spacer through apertures extending radially through the disk spacer, a disk clamp for clamping the plurality of disks to the spindle motor, the disk clamp having a plurality of clamp through apertures adjacent to an inner diameter of the disk clamp, the clamp through apertures being circumferentially spaced-apart, each of the plurality of clamp through apertures extending longitudinally through the disk clamp, wherein the clamp apertures, the hub apertures and the spacer through apertures are aligned for allowing airflow to pass through the apertures when the plurality of disks are rotating.

BRIEF DESCRIPTION OF THE DRAWINGS

FIG. 6b is a side view of the spindle motor shown in FIG. 6a; and

DETAILED DESCRIPTION

Figure 7:
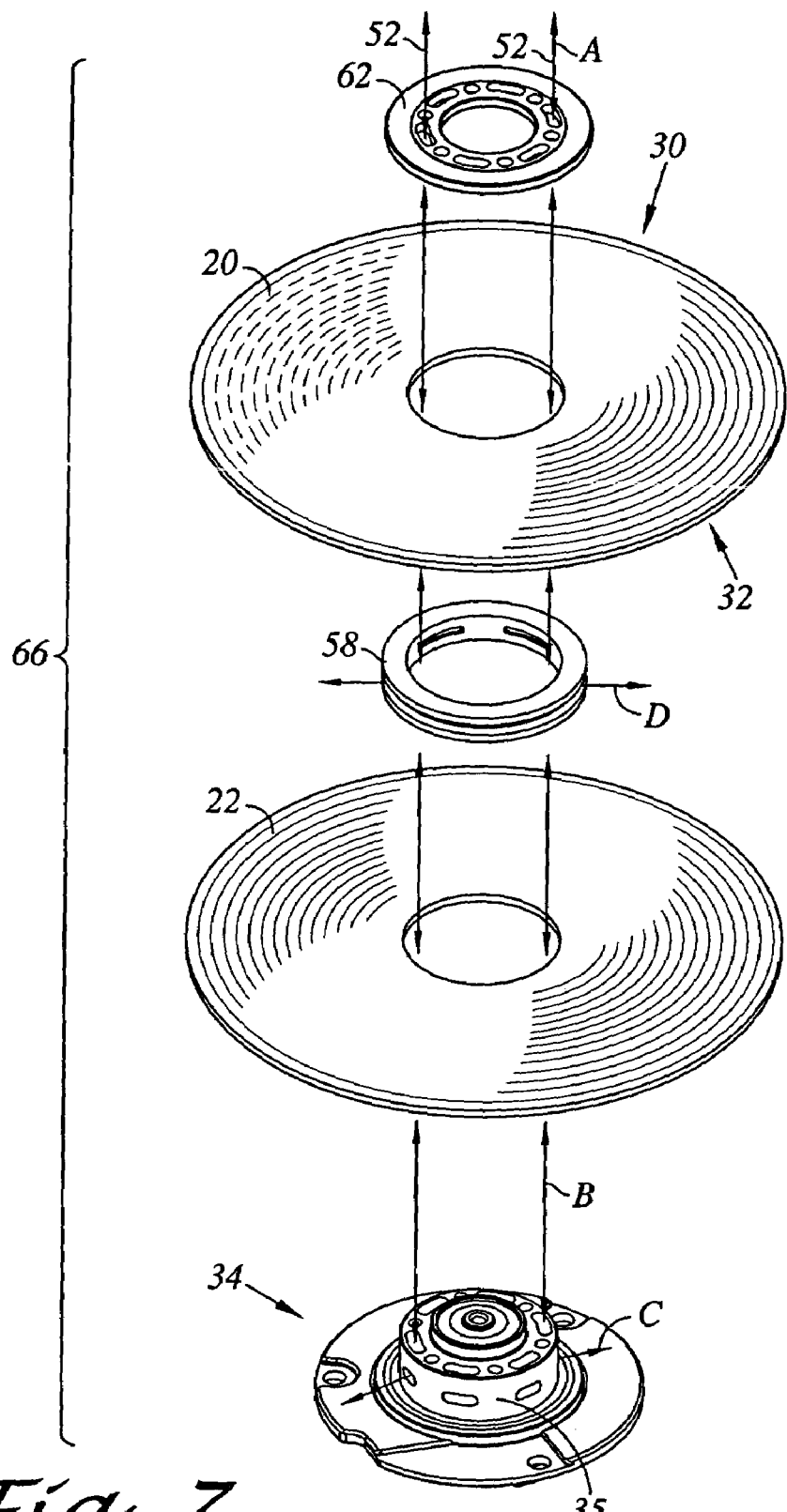
FIG. 7 is an exploded perspective view of the disk stack shown in FIG. 1.

With reference to FIGS. 1, 3, 4, and 5, a disk drive 10 includes a disk drive base 16, a spindle motor 34 attached to disk drive base 16, spindle motor 34 including a hub 35 having a plurality of hub apertures 76, each of the plurality of hub apertures 76 extending through a portion of hub 35, a plurality of disks positioned on spindle motor 34, the plurality of disks including a first disk 20 and a second disk 22, a disk spacer 58 positioned between first 20 and second 22 disks, disk spacer 58 having a plurality of spacer through apertures 70, spacer through apertures 70 being circumferentially spaced-apart, each of the plurality of spacer through apertures 70 extending radially through disk spacer 58, a disk clamp 62 for clamping the plurality of disks to spindle motor 34, disk clamp 62 having a plurality of clamp through apertures 64 adjacent to an inner diameter 168 of disk clamp 62, clamp through apertures 64 being circumferentially spaced-apart, each of the plurality of clamp through apertures 64 extending longitudinally through disk clamp 62, wherein clamp through apertures 64, hub apertures 76 and spacer through apertures 70 are aligned for allowing airflow to pass through the apertures when the plurality of disks are rotating. An example of airflow is shown in FIGS. 2B and 7, to be described in more detail below.

Figure 1:
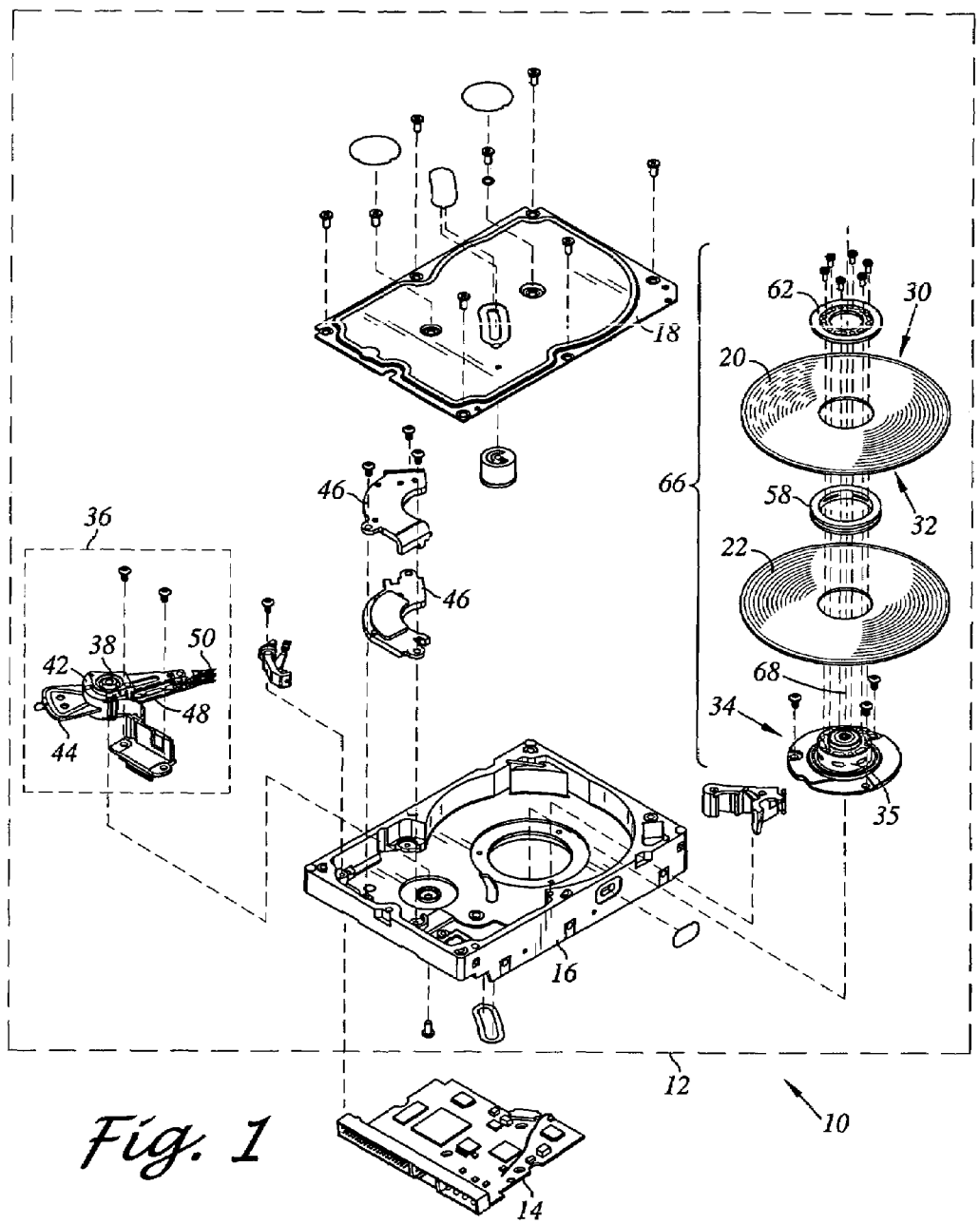
FIG. 1 is an exploded perspective view of a disk drive incorporating an embodiment of this invention.

Continuing with FIG. 1, disk drive 10 includes a head disk assembly 12 and a printed circuit board assembly 14. Disk drive 10 includes a disk drive cover 18, a head stack assembly 36, and a permanent magnet arrangement defined by upper and lower VCM plates 46. Head stack assembly 36 includes an actuator body 42, a plurality of actuator arms 48, a pivot bearing cartridge 38 installed within a bore of actuator body 42, and a coil portion 44 having a voice coil. A respective head gimbal assembly 50 is attached to each respective actuator arm 48. Spindle motor 34 includes a shaft, which defines a longitudinal axis 68. As shown in FIG. 1, a disk stack 66 generally includes spindle motor 34, disks 20, 22, disk spacer 58, and a disk clamp 62 for clamping disks 20 and 22 to spindle motor 34 via suitable fasteners such as screws. Each disk may include a top recording surface 30 and a bottom recording surface 32. In alternative embodiments, disk drive 10 may include more than two disks, such as three or more disks.

Figure 2B:
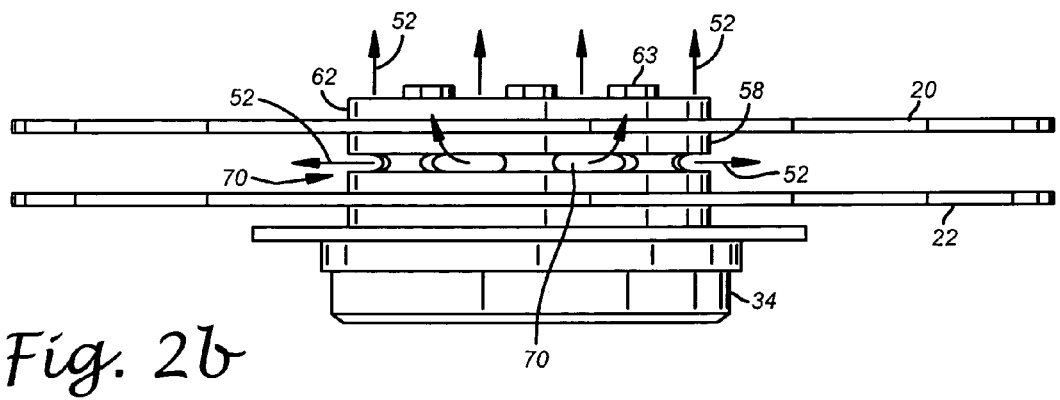
FIG. 2b is a side view of the disk stack shown in FIG. 1.
Figure 3:
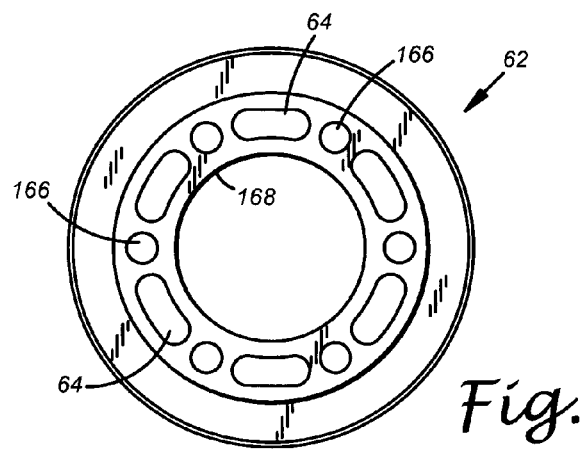
FIG. 3 is a top plan view of the disk clamp shown in FIG. 1.

With reference to FIG. 3, disk clamp 62 includes clamp through apertures 64, which in the embodiment shown, are generally equally circumferentially spaced-apart. Disk clamp 62 further includes a plurality of fastener through apertures 166 circumferentially spaced-apart adjacent to inner diameter 168 of disk clamp 62, fastener through apertures 166 and clamp through apertures 64 being alternately arranged on disk clamp 62. Fastener through apertures 166 accommodate fasteners 63 as shown in FIG. 2B.

Figure 4:
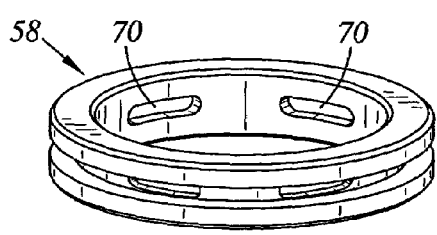
FIG. 4 is a perspective view of the disk spacer shown in FIG. 1.

With reference to FIG. 4, disk spacer 58 includes spacer through apertures 70, which in the embodiment shown are generally equally circumferentially spaced-apart. In an alternative embodiment, disk spacer 58 may have a generally uniform thickness in the radial direction such that spacer through apertures 70 extend radially from an inner diameter of disk spacer 58 to an outer diameter of the disk clamp.

Figure 5:
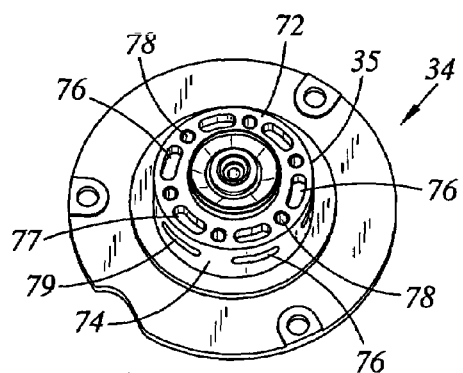
FIG. 5 is a perspective view of a spindle motor shown in FIG. 1.

With reference to FIG. 5, hub 35 includes an annular surface 72 and a generally cylindrically-shaped surface 74, each of hub apertures 76 includes a respective pair of openings 77, 79, each respective pair of openings includes a first opening 77 defined on annular surface 72 and a second opening 79 defined on cylindrically-shaped surface 74. Hub 35 further includes a plurality of fastener apertures 78, which alternate with first openings 77 of hub apertures 76. First and second openings 77, 79 are joined by a passageway, which together define hub aperture 76 such that airflow is allowed to pass through each hub aperture 76. In an alternative embodiment, first opening 77 may extend out radially to the periphery of hub 35 such that first opening 77 and second opening 79 form a single opening, i.e., the hub material between first opening 77 and second opening 79 is removed, via a machining operation.

Figure 6A:
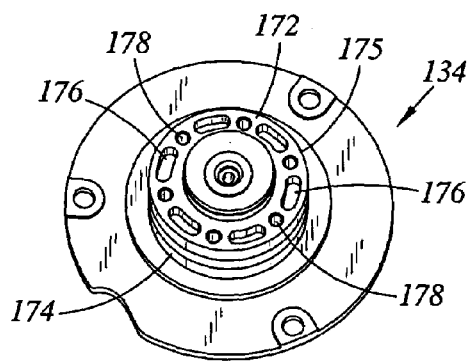
FIG. 6a is a perspective view of a spindle motor in accordance with another embodiment of this invention.
Figure 6B:
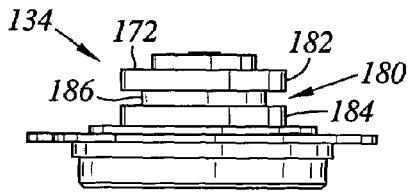

With reference to FIGS. 6A and 6B, an alternative embodiment of a spindle motor is shown in which a spindle motor 134 includes a hub 175 having a hub surface 174 defining a continuous opening 180 around its periphery, continuous opening 180 being adjacent to spacer through apertures 70 when a disk spacer, such as disk spacer 58 is installed on spindle motor 134. Hub 175 includes an annular surface 172 and a plurality of hub apertures 176 arranged alternately with a plurality of fastener apertures 178. Hub surface 174 includes a first hub surface 182, a second hub surface 186, and a third hub surface 184.

With reference to FIGS. 2B and 7, an example of airflow denoted by 52 when the plurality of disks 20, 22 are rotating is shown. Airflow first passes through clamp through apertures 64 as denoted by A, then passes through hub apertures as denoted by B, C, and then passes through spacer through apertures 70, as denoted by D and vice versa.

Figure 2A:
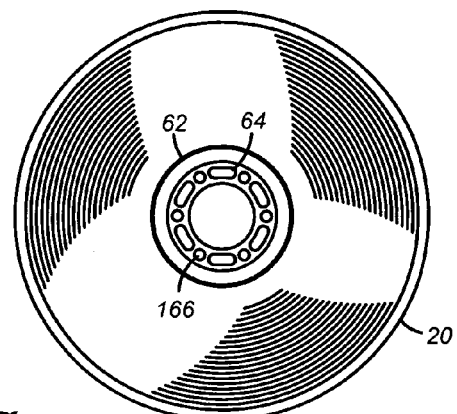
FIG. 2a is a top plan view of the disk stack shown in FIG. 1.

As also shown in FIG. 7 in conjunction with FIGS. 2A and 5, clamp through apertures 64 and first openings 77 are radially and circumferentially aligned, i.e., clamp through apertures 64 and first openings 77 are positioned above each other allowing for a maximum amount of airflow to pass through, thereby reducing disk flutter. In alternative embodiments, the clamp through apertures and the first openings may be radially and/or circumferentially offset relative to each other in a manner allowing for sufficient airflow to pass through when the disks are rotating, thereby also reducing disk flutter.

The spacer through apertures, hub apertures, and the clamp through apertures may be formed via a suitable stamping and/or machining operation. The number, shape, and spacing of the spacer through apertures, hub apertures, and the clamp through apertures may be different than what's shown in the figures.

What is claimed is:

1. A disk drive comprising:
a disk drive base;
a spindle motor attached to the disk drive base, the spindle motor including a hub having a plurality of hub apertures, each of the plurality of hub apertures extending through a portion of the hub;
a plurality of disks positioned on the spindle motor, the plurality of disks including a first disk and a second disk;
a disk spacer positioned between the first and second disks, the disk spacer having a plurality of spacer through apertures, the spacer through apertures being circumferentially spaced-apart, each of the plurality of spacer through apertures extending radially through the disk spacer;
a disk clamp for clamping the plurality of disks to the spindle motor, the disk clamp having a plurality of circumferentially spaced-apart clamp through apertures adjacent to an inner diameter of the disk clamp, the clamp through apertures being circumferentially spaced-apart, each of the plurality of clamp through apertures extending longitudinally through the disk clamp, the disk clamp further including a plurality of fastener through apertures circumferentially spaced-apart adjacent to the inner diameter of the disk clamp, the fastener through apertures and the clamp through apertures being alternately arranged on the disk clamp;
wherein the clamp through apertures, the hub apertures and the spacer through apertures are aligned for allowing airflow to pass through the apertures when the plurality of disks are rotating.

2. The disk drive of claim 1, wherein the spacer apertures are generally equally circumferentially spaced-apart.

3. The disk drive of claim 1, wherein the hub includes an annular surface and a generally cylindrically-shaped surface, each of the hub apertures includes a respective pair of openings, each respective pair of openings includes a first opening defined on the annular surface and a second opening defined on the cylindrically-shaped surface.

4. The disk drive of claim 3, wherein the clamp through apertures and the first openings are radially and circumferentially aligned.

5. The disk drive of claim 1, wherein the hub includes a hub surface defining a continuous opening around its periphery, the continuous opening being adjacent to the spacer through apertures.

6. A disk drive comprising:

a disk drive base;

a spindle motor attached to the disk drive base, the spindle motor including a hub having a plurality of hub apertures, each of the plurality of hub apertures extending through a portion of the hub, the hub including an annular surface and a generally cylindrically-shaped surface, each of the hub apertures including a respective pair of openings, each respective pair of openings including a first opening defined on the annular surface and a second opening defined on the cylindrically-shaped surface;

a plurality of disks positioned on the spindle motor, the plurality of disks including a first disk and a second disk;

a disk spacer positioned between the first and second disks, the disk spacer having a plurality of spacer through apertures, the spacer through apertures being circumferentially spaced-apart, each of the plurality of spacer through apertures extending radially through the disk spacer;

a disk clamp for clamping the plurality of disks to the spindle motor, the disk clamp having a plurality of clamp through apertures adjacent to an inner diameter of the disk clamp, the clamp through apertures being circumferentially spaced-apart, each of the plurality of clamp through apertures extending longitudinally through the disk clamp;

wherein the clamp through apertures, the hub apertures and the spacer through apertures are aligned for allowing airflow to pass through the apertures when the plurality of disks are rotating.

7. The disk drive of claim 6, wherein the clamp through apertures are generally equally circumferentially spaced-apart.

8. The disk drive of claim 7, wherein the disk clamp further includes a plurality of fastener through apertures circumferentially spaced-apart adjacent to the inner diameter of the disk clamp, the fastener through apertures and the clamp through apertures being alternately arranged on the disk clamp.

9. The disk drive of claim 6, wherein the spacer apertures are generally equally circumferentially spaced-apart.

10. The disk drive of claim 6, wherein the clamp through apertures and the first openings are radially and circumferentially aligned.

11. The disk drive of claim 6, wherein the hub includes a hub surface defining a continuous opening around its periphery, the continuous opening being adjacent to the spacer through apertures.

12. A disk drive comprising:

a disk drive base;

a spindle motor attached to the disk drive base, the spindle motor including a hub having a plurality of hub apertures, each of the plurality of hub apertures extending through a portion of the hub, the hub including a hub surface defining a continuous opening around its periphery;

a plurality of disks positioned on the spindle motor, the plurality of disks including a first disk and a second disk;

a disk spacer positioned between the first and second disks, the disk spacer having a plurality of spacer through apertures, the spacer through apertures being circumferentially spaced-apart, each of the plurality of spacer through apertures extending radially through the disk spacer, the continuous opening being adjacent to the spacer through apertures;

a disk clamp for clamping the plurality of disks to the spindle motor, the disk clamp having a plurality of clamp through apertures adjacent to an inner diameter of the disk clamp, the clamp through apertures being circumferentially spaced-apart, each of the plurality of clamp through apertures extending longitudinally through the disk clamp;

wherein the clamp through apertures, the hub apertures and the spacer through apertures are aligned for allowing airflow to pass through the apertures when the plurality of disks are rotating.

13. The disk drive of claim 12, wherein the clamp through apertures are generally equally circumferentially spaced-apart.

14. The disk drive of claim 13, wherein the disk clamp further includes a plurality of fastener through apertures circumferentially spaced-apart adjacent to the inner diameter of the disk clamp, the fastener through apertures and the clamp through apertures being alternately arranged on the disk clamp.

15. The disk drive of claim 12, wherein the spacer apertures are generally equally circumferentially spaced-apart.

16. The disk drive of claim 12, wherein the hub includes an annular surface and a generally cylindrically-shaped surface, each of the hub apertures includes a respective pair of openings, each respective pair of openings includes a first opening defined on the annular surface and a second opening defined on the cylindrically-shaped surface.

17. The disk drive of claim 16, wherein the clamp through apertures and the first openings are radially and circumferentially aligned.

* * * * *